United States Patent [19]

Morgan et al.

[11] 3,869,419

[45] Mar. 4, 1975

[54] ANISOTROPIC DOPES OF POLYAMIDES FROM FUMARIC AND/OR MESACONIC ACID

[75] Inventors: Paul Winthrop Morgan, West Chester, Pa.; Terry Carl Pletcher, Hockessin, Del.

[73] Assignee: E. I. du Pont de Nemours and Company, Wilmington, Del.

[22] Filed: Oct. 27, 1972

[21] Appl. No.: 301,292

[52] U.S. Cl............................................ 260/30.8 R
[51] Int. Cl......................... C08g 51/46, C08g 51/47
[58] Field of Search............ 260/308 R, 78 R, 78 U, 260/47 CZ

[56] References Cited
UNITED STATES PATENTS
3,647,765  9/1972  Mortillaro...................... 260/78 UA
3,671,542  6/1972  Kwolek........................... 260/30.8 R FOREIGN PATENTS OR APPLICATIONS
1,210,595  10/1970  Great Britain
1,589,406  5/1970  France
1,770,128  9/1971  Germany OTHER PUBLICATIONS
Kolesmkov et al., Usokamolekularnye Soedeneye 4 1,119;1,121 (1960).

*Primary Examiner*—Donald E. Czaja
*Assistant Examiner*—S. M. Person

[57] ABSTRACT

This invention provides novel spinning dopes of polyamides and copolyamides consisting essentially of repeating units of the formula:

(I)    —HN—$R_1$—NHCO—$R_2$—CO— wherein $R_1$ represents an aromatic radical selected from the group of 1,4-phenylene; methyl-1,4-phenylene; chloro-1,4-phenylene; bromo-1,4-phenylene, fluoro-1,4-phenylene; 4,4'-carbonamidodiphenylene; 4,4'-biphenylene; 3,3'-dichloro-4,4'-biphenylene; 3,3'-dimethoxy-4,4'-biphenylene; and 3,3'-dimethyl-4,4'-biphenylene; $R_2$ represents an organic radical selected from the group of trans-vinylene and trans-methylvinylene radicals; with the proviso that up to 90 mole percent of the $R_2$ radicals may be replaced by radicals selected from the group of 1,4-phenylene and chloro-1,4-phenylene.

3 Claims, No Drawings

ANISOTROPIC DOPES OF POLYAMIDES FROM FUMARIC AND/OR MESACONIC ACID

This invention relates to novel spinning dopes of film- and fiber-forming stiff-chain polyamides and copolyamides prepared from amid-forming derivatives of fumaric acid and/or mesaconic acid (i.e., methylfumaric acid) and aromatic diamines.

BACKGROUND OF THE INVENTION

The preparation of copolyamides from derivatives of fumaric acid and mixtures of diamines is taught in British Patent Specification No. 1,210,595. Piperazine-based fumaramides are shown in Canadian Pat. No. 841,109. The preparation of low molecular weight copolyamides from fumaryl chloride and aromatic diamines is taught by Kolesnikov et al., in "Vsokomolekularnye Soedineniya" 2, 1119-1121 (1960). Unsaturated copolyamides prepared from dihalides of mesaconic acid and a class of diamines are disclosed in U.S. Pat. No. 3,647,765. Anisotropic spinning dopes and high strength fibers of aromatic polyamides and copolyamides are taught in Kwolek U.S. Pat. No. 3,671,542.

SUMMARY OF THE INVENTION

This invention provides novel spinning dopes of polyamides and copolyamides consisting essentially of repeating units of the formula:

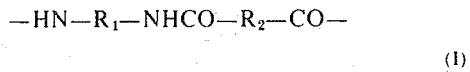

wherein $R_1$ represents an aromatic radical selected from the group of 1,4-phenylene; methyl-1,4-phenylene; chloro-1,4-phenylene; bromo-1,4-phenylene, fluoro-1,4-phenylene; 4,4'-carbonamidodiphenylene; 4,4'-biphenylene; 3,3'-dichloro-4,4'-biphenylene; 3,3'-dimethoxy-4,4'-biphenylene; and 3,3'-dimethyl-4,4'-biphenylene; $R_2$ represents an organic radical selected from the group of trans-vinylene and trans-methylvinylene radicals; with the proviso that up to 90 mole percent of the $R_2$ radicals may be replaced by radicals selected from the group of 1,4-phenylene and chloro-1,4-phenylene.

The polyamides and copolyamides which are useful for fibers exhibit inherent viscosity values of at least about 1.0, preferably 2.0 or higher, measured as described hereinafter.

Preferably, formula (I) polyamides and copolyamides described above are prepared by the reaction between at least one diamine of the formula $$H_2N—R_1—NH_2 \quad (II\text{-}A)$$

and at least one diacid chloride of the formula

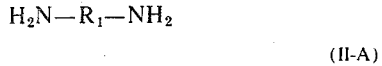

wherein $R_1$ and $R_2$ have the significance set forth hereinbefore.

This invention provides novel, optically anisotropic dopes which are prepared from the polymers described above and concentrated sulfuric acid within the concentration range of about 96–105 percent $H_2SO_4$, preferably about 99–104 percent, or fluorosulfonic acid.

DESCRIPTION OF THE PREFERRED EMBODIMENTS

The polymers described above may be prepared by low temperature solution polymerization processes similar to those described in, e.g., Kwolek U.S. Pat. No. 3,063,966. In this process, a cooled (e.g., with ice, ice-water, solid carbon dioxide), stirred solution of a formula (II–A) diamine is formed in a basic solvent system, e.g., a mixture of hexamethylphosphoramide (HMPA) and N-methylpyrrolidone-2 (NMP). Other useful media are HMPA alone, N,N-dimethylacetamide (DMAc), N,N,N',N'-tetramethylurea (TMU), and mixtures thereof. Fumaryl chloride

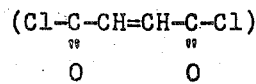

and/or methylfumaryl chloride

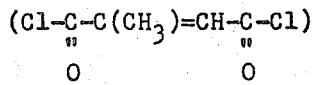

or mixtures thereof with terephthaloyl chloride or chloroterephthaloyl chloride is then added rapidly to the diamine solution. The diacid chlorides need not be mixed prior to their addition to the diamine solution, but may be added separately. The reaction mixture may be stirred and/or allowed to stand until the desired degree of polymerization has been achieved. Frequently, the reaction mixture becomes a difficultly stirrable mass within a relatively short period of time after addition of the acid chlorides. For some combinations of intermediates the addition of anhydrous lithium chloride or calcium chloride to the amide medium, or the generation of such salts during or near the end of the polymerization by addition of appropriate based, is beneficial in increasing the molecular weight of the product. It is convenient to obtain the copolymeric product by combining the reaction mixture, e.g., as a viscous solution or solid mass, with a polymer nonsolvent, e.g., water, after which the copolymer is collected by filtration, washed (e.g., with water, acetone, alcohol), and dried prior to being dissolved to form the dopes of this invention. During polymerization, the acidic hydrogen chloride by-product generated by the condensation reaction may be neutralized by adding to the reaction mixture a suitable neutralizing agent, e.g., lithium carbonate.

Formula (II-A) diamines useful for preparing the polyamides and copolyamides useful in this invention include 1,4-phenylenediamine; chloro- bromo- and fluoro-1,4-phenylenediamines; methyl-1,4-phenylenediamine; 4,4'-diaminobenzanilide; benzidine, 3,3'-dimethylbenzidine; 3,3'-dimethyoxybenzidine; and 3,3'-dichlorobenzidine. Formulae (II—B) diacid chlorides useful in this invention are fumaryl chloride and methylfumaryl chloride. As noted previously, a portion of these diacid chlorides may be replaced by terephthaloyl chloride and/or chloroterephthaloyl chloride.

Preferred polyamides are poly(chloro-1,4-phenylene fumaramide) and poly(1,4-phenylene fumaramide) while preferred copolyamides are copoly(chloro-1,4-phenylene fumaramide/terephthalamide) (20/80) and poly(1,4-phenylene fumaramide/terephthalamide)

(20/80). Other useful copolyamides include copoly(1,4-phenylene fumaramide/mesaconamide) copoly(1,4-phenylene fumaramide/chloroterephthalamide)(20/80).

Additionally, up to a total of about 10 mole percent of the repeating units in the useful polymers of this invention may be derived from reactants which do not conform to the formulae (II-A) or (II-B). These reactants, used in appropriate amounts, may be copolyamide-forming aromatic monomers possessing both amine and acid chloride groups (e.g., paraaminobenzoyl chloride hydrochloride); diamines and diacid chlorides characterized by ring-atom-ring structures [e.g., bis(4-aminophenyl)ether and bis(4-chlorocarbonyl phenyl)ether]; and aliphatic diacid chlorides characterized by 4-12 carbon atoms (e.g., adipyl chloride, sebacyl chloride). When meta-oriented aromatic diamines and diacid chlorides (e.g., m-phenylenediamine and isophthaloyl chloride) are employed as coreactants, preferably no more than about 5 mole percent of the repeating units are derived from these meta-oriented comonomers.

In preparation of the polymers useful in this invention, chain terminators may be used. Among suitable chain terminators are compounds which can react monofunctionally with the acid chloride ends of these polymers, such as ammonia, ethylamine, dimethylamine, diethylamine, aniline, etc. Other terminators include hydroxylic compounds such as methyl alcohol, ethyl alcohol, isopropyl alcohol, and phenol. Useful terminators which react monofunctionally with the amine ends of these polymer chains include acid chlorides, e.g., acetyl chloride, acid anhydrides, e.g., acetic anhydride, and isocyanates, e.g., phenyl isocyanate.

Useful Solvents

The preferred solvent for preparing the anisotropic dopes of this invention is concentrated sulfuric acid within the concentration range of about 96–105 percent, preferably 99–104 percent. Optical anisotropy is described in detail in Kwolek U.S. Pat. No. 3,671,542.

Dope Preparation

Anisotropic dopes may be prepared by first combining under anhydrous conditions and with stirring and mixing, suitable quantities of an appropriate polymer of this invention with the sulfuric acid to form compositions containing from about 7–23 percent by weight polymer, preferably about 10–20 percent by weight. In some instances fluorosulfonic acid is used as the solvent for preparation of the anisotropic dopes. Generally, during addition of the polymer, the heat of mixing should be controlled in order that the temperature of the combined ingredients does not exceed 90°C., preferably not over 85°C. This may be accomplished by using cooled quantities of acid, application of external cooling baths to the mixing vessel, controlled rate of addition of the solid polymeric material, appropriate stirring action, and/or combinations of these procedures. However, in some instances, as illustrated in the examples which follow, it may be desirable to mix the ingredients with a moderate degree of heating in order to achieve more rapid dissolution of the polymeric solid. During preparation of the dope and the spinning thereof, the dopes should be maintained at temperatures which reduce the opportunity for copolymer degradation to occur.

Anisotropic dopes of this invention may become isotropic when warmed to temperatures well beyond that needed to prevent any solidification. This state is apparent in that shear opalescence is absent and the dope does not transmit light when viewed between crossed polarizers.

Since excessive water can interfere with the formation of dopes suitable for spinning and can contribute to degradation of the copolymer, dopes should be prepared with relatively dry copolymer samples under conditions where exposure to atmospheric moisture is minimized, e.g., under a blanket of dry nitrogen.

Some dopes of this invention are solid at room temperature and must be heated, as well as stirred or otherwise mixed, to attain sufficient fluidity prior to being shaped, e.g., into fibers. As the temperature of these solid dopes is raised, melting occurs and the dopes become less viscous.

For the preparation of fluid, shapable dopes from solid dopes, it is preferred that the solid dope be heated only slightly above its melting point, e.g., up to about 10°C. higher than the melting point. After being initially prepared, the dopes of this invention, including those obtained by heating the above-described solid dopes may be very viscous. Processing them into shaped articles, e.g., the spinning fibers, may be facilitated by increasing their fluidity by means of adequate stirring or other shearing action.

One type of apparatus which is useful for increasing the fluidity of these dopes prior to spinning or casting is referred to herein as a "twin-cell unit" and is described below, together with fluid transfer and spinning equipment. This apparatus, into which the initially prepared dope is placed, consists of two open top cylinders (each of about 250 ml. capacity) connected by a base block. Each cylinder has a hole in its base above a filter pack [3/20-mesh screens/2/100-mesh screens/1/135-mesh screen/2/100-mesh screens/2/20-mesh screens (mesh/inch = mesh/2.54 cm.)] in the base block which leads to a passage in the block to the other filter pack and cylinder. The mixing device is fitted to a pair of pistons which closely fit each cylinder. A small hole in each piston is opened for the initial fitting by each piston to insure the removal of air and is then closed. A water bath, e.g., at about room temperature to about 80°C., is placed around the mixing device. During the course of about 1 to 2 hours the dope is pushed by the pistons from one cylinder to the other for several cycles, e.g., 8–15 cycles. With all of the dopes in one cylinder (and the connecting passage), the mixing device is connected through a hole (previously plugged) in the base block leading to the connecting passage by a length of stainless tubing in the shape of a gooseneck to an electrically heated spinning block having a filter pack composed of /1/20-mesh screen/1/disc of Dynalloy filter material (X—5) (product of Fluid Dynamics Co., Morristown, N.J.) /2/100 mesh-screens/1/325-mesh screen/2/100-mesh screens and an appropriately selected spinneret. The water bath is replaced around the mixing device and the tubing. The short length of the tubing between the water bath and the spinning block which may be heated is insulated with glass wool. The dope is then extruded from the spinneret, as shown in a following section.

Anisotropic Character of the Dopes

The dopes of this invention are optically anisotropic, i.e., microscopic regions of a given dope are birefringent; a bulk dope sample depolarizes plane-polarized light because the light transmission properties of the microscopic areas of the dope vary with direction. This characteristic is associated with the existence of at least part of the dopes in the liquid crystalline or mesomorphic state. The liquid crystalline state of the dopes of this invention is of the nematic type.

The dopes of this invention which exhibit optical anisotropy do so while the dopes are in the relaxed state. This is in contrast to conventional polymer and copolymer solutions which may be caused to depolarize plane-polarized light when subjected to appreciable shear.

There is a complex relationship existing among, e.g., the concentration of the particular polymer species, the inherent viscosity thereof, the solvent system, and the dope temperature which generally determines the ranges in which a given dope is anisotropic or isotropic. A useful polymer concentration dope viscosity relationship exists for given polymer-solvent combinations which are capable of forming the anisotropic dopes of this invention. For such combinations, the dope formed is isotropic when the copolymer concentration is below a particular level. As the concentration of the copolymer is increased, the viscosity of the dope increases. However, at a point identified herein as the "critical concentration point" there is a sharp discontinuity in the slope of the viscosity vs. concentration curve when the dope changes from isotropic to partially anisotropic without the formation of a solid phase. Further addition of copolymer results in a decrease in the viscosity of the dope as it becomes more anisotropic. Illustrative viscosity vs. concentration curves of this type are shown in Kwolek U.S. Pat. No. 3,671,542. The critical concentration point (as well as the complete viscosity vs. concentration curve) is routinely determined using conventional concentration and viscosity measuring techniques (see Kwolek U.S. Pat. No. 3,671,542).

A qualitative determination of the anisotropic character of these dopes may be made with the naked eye. These dopes may appear turbid or hazy and yet contain no, or practically no undissolved solid. When the dope, seen under reflected ordinary light, is disturbed by shaking or rolling the vessel containing the dope or by only slow stirring, there is produced a characteristic, readily observed, satin-like sheen or glow which is observed even after the disturbance ceases, and which decreases in intensity thereafter. This may be described as being a pearly or opalescent quality of the dope. Dopes which are disturbed as described above often give the appearance of having striations and/or graininess in the surface. These visual effects are observed in the anisotropic dopes of this invention. This may commonly be referred to as "stir opalescence." Further details on qualitative and quantitative determinations of optical anisotropy are presented in Kwolek U.S. Pat. No. 3,671,542. The latter patent describes the improved properties (e.g., higher tenacity and initial modulus) of fibers spun from anisotropic, rather than isotropic systems.

Fiber Preparation

The dopes of this invention may be formed into fibers of high quality by spinning them into suitable baths.

The dopes of this invention may be spun into fibers by wet and "air-gap" spinning techniques, using spinnerets and other apparatus constructed of materials resistant to the strong acids used. In air-gap spinning the spinneret is located in air or in an inert gaseous medium a short distance (e.g., 0.1 to 10 cm., preferably from about 0.5 to 2 cm.) above the surface of a coagulating bath. Spinning of polyacrylonitrile fibers by one working of this general technique is described in, e.g., Ucci U.S. Pat. No. 3,080,210. A variety of baths may be used to coagulate the extruded dope into fibers. The baths may be, e.g., water as shown in the examples, or a dilute solution of sulfuric acid. Preferably, the temperature of a coagulation bath is room temperature or below.

It is desirable to completely remove the spinning solvent from fiber samples prepared from the dopes of this invention. Water alone or aqueous alkaline solutions may be used for removal of the residual acid. A convenient method is to spray the threadline as it leaves the coagulating bath with an aqueous alkaline solution (e.g., saturated sodium bicarbonate), remove the surface liquid from the threadline with a wiping device (e.g., a sponge) or a jet, wash with water and/or aqueous alkaline solutions to reduce the acid content, and wind up the fibers on bobbins. The fibers may be soaked in water for a period sufficiently to remove the acid. The thoroughly washed fibers may be dried on the bobbin in air at temperatures of up to about 110°C. They can also be conveniently dried on heated rolls.

It will be understood that the usual additives such as dyes, fillers, antioxidants, etc., can be incorporated into the dopes of this invention for the purpose intended, prior to shaped article preparation.

The fibers prepared from the acidic dopes of this invention exhibit high values of tensile properties, especially in the as-extruded state, i.e., without subsequent hot drawing or annealing. The tensile properties of the fibers prepared from the dopes of this invention can be improved by hot drawing operations.

These as-extruded fibers, spun from the anisotropic dopes of this invention, exhibit tenacity and initial modulus values (measured as described hereinafter) of at least 5 gpd. and 200 gpd., respectively, preferably of at least about 7 gpd. and 300 gpd., respectively. These as-extruded fibers exhibit orientation angles of less than about 40°.

The excellent properties of these fibers render the fibers particularly useful as reinforcing agents for plastic laminates, tire cords, V-belts, and the like. The fibers exhibit improved transverse properties and improved retention of properties upon exposure to heat.

MEASUREMENTS AND TESTS

Inherent Viscosity

Inherent viscosity ($\eta$inh) is defined by the following equation:

$$\eta\text{inh} = \ln(\eta\text{rel})/C$$

wherein ($\eta$rel) represents the relative viscosity and C represents a concentration of 0.5 gram of the copolymer in 100 ml. of solvent. The relative viscosity ($\eta$rel) is determined by dividing the flow time in a capillary viscometer of a dilute solution of the copolymer by the flow time for the pure solvent. The dilute solutions used herein for determining ($\eta$rel) are of the concentration expressed by (C), above; flow times are determined at 30°C.; the solvent is sulfuric acid (96–98 percent sulfuric).

Fiber Tensile Properties

Filament properties are measured on fibers that have been conditioned at 21°C. and 65 percent relative humidity (R.H.) for at least 16 hours unless otherwise specified. Yarn properties are measured on yarn that has been conditioned at 24°C. and 55 percent R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on three filaments are averaged. Yarns are given three turns per inch (2.54 cm.) twist (under 0.1 gpd. tension) and broken with a 10-inch (25.4 cm.) gage length. All samples are elongated at a constant rate of extension (10 percent elongation/minute for fibers having an E of under 8 percent, and 60 percent elongation/minute for fibers with E of 8 to 100 percent) until the sample breaks.

The denier of a single filament (d.p.f.) is calculated from its functional resonant frequency, determined by vibrating a 7 to 9 cm. length of fiber under tension with changing frequency. (A.S.T.M. D1577-66, part 25, 1968). This filament is then used for 1 break.

The denier of yarn is determined by weighing a known length (at 0.1 gpd. tension); 90 cm. length is convenient.

The tenacity (grams/denier) as defined in A.S.T.M. D12101, part 25, 1968 are obtained from the load-elongation curve and the measured denier. In actual practice, the measured denier of the sample, test conditions, and sample identification are fed to a computer before the start of a test; the computer records the load-elongation curver of the fiber as it is broken and then calculates the fiber properties.

It should be noted that different values are obtained from single filaments (filament properties) and from multifilament strands (yarn properties) of the same sample. Unless specified otherwise all properties given herein are filament properties.

Orientation Angle

Orientation angle (O.A.) values for the fibers prepared as described hrein may be measured by the procedure described in Kwolek U.S. Pat. No. 3,671,542.

EXAMPLE 1

This example illustrates the preparation of copoly-(1,4-phenylene fumaramide/terephthalamide) (10/90) and fibers thereof, spun from an optically anisotropic dope.

To a stirred mixture of HMPA/NMP (650 ml./650 ml.) at room temperature is added 1,4-phenylene diamine (32.4 g., 0.3 mole). This solution is cooled to −10°C. in a bath of solid carbon dioxide and acetone. After this cooling bath is removed and replaced with an ice-water bath, fumaryl chloride (4.59 g., 0.03 mole) is added to the stirred solution. After 2 minutes, terephthaloyl chloride (54.81 g., 0.27 mole) is added slowly to the stirred reaction mixture. Stirring is continued for a total of 2 hours and 40 minutes, with the reaction vessel being externally cooled for the first hour and 40 minutes. The reaction mixture is permitted to stand at autogenous temperature for 2 days, after which it is combined with water to precipitate the copolymer which is collected, washed separately with water and with methanol and dried in vacuo overnight at 80°C.

The dried copolymer exhibits an inherent viscosity of 6.16.

An anisotropic spinning dope containing 18 percent by weight solids is prepared by combining 59 g. of the above-described copolymer, with 269 g. of 101.3 percent sulfuric acid with stirring. The combined ingredients are transferred to the previously described twin-cell unit and are mixed thoroughly at 85°C. during the course of 10 cycles to form an anisotropic spinning dope. This dope, maintained at 85°C., is extruded through a spinneret [40-holes, each hole of 0.002 inch (0.005 cm.) diameter, maintained at 90°C.] into an aqueous coagulating bath maintained at 0°C. (ice-water) and positioned one-half inch (1.27 cm.) vertically below the face of the spinneret. The fibers emerging from the bath are washed with water and are wound up on bobbins at the rate of 505 ft./min. (159 m./min.). The fibers are then soaked in two changes of water (3 hours and overnight, respectively) and dried in air at ambient temperature. The washed and dried filaments exhibit the following tensile properties: T/E/Mi: 20.6/4.69/594; O.A. = 18°.

EXAMPLE 2

This example illustrates the preparation of copoly-(1,4-phenylene fumaramide/terephthalamide) (20/80) and fibers thereof, spun from an optically anisotropic dope.

In this synthesis, the solvents and reactants are the same as in Example 1 except that 9.18 g. (0.06 mole) of fumaryl chloride and 48.72 g. (0.24 mole) of terephthaloyl chloride are used. The procedure of Example 1, above, is followed with the exception that the reaction mixture is cooled in a bath of solid carbon dioxideacetone for 20 minutes after the addition of the terephthaloyl chloride. The cooling bath is then removed and stirring is continued for 1.5 hour. The reaction mixture is permitted to stand at autogenous temperature for approximately 65 hours, after which the copolymer is precipitated, collected, washed, and dried as described in Example 1. For the dried product, $\eta inh = 4.61$.

An anisotropic spinning dope containing 20 percent by weight solids is prepared by combining 68 g. of the above-prepared copolymer with 272 g. of 101.3 percent sulfuric acid, with stirring. The combined ingredients are transferred to the previously described twin cell and are mixed thoroughly in 80°C. during the course of 10 cycles to form an anisotropic spinning dope. The dope, maintained at 70°C., is extruded through a spinneret as described in Example 1, maintained at 70°C., into an aqueous coagulation bath maintained at 1°C. (ice-water) and positioned three-fourth inch (1.9 cm.) vertically below the face of the spinneret. The fibers emerging from the bath are washed with water and are wound up at the rate of 658 ft./min. (200 m./min.). The fibers are collected, washed, and dried as described in Example 1. The washed and dried filaments exhibit the following tensile properties: T/E/Mi: 24.3/5.72/676; O.A. = 17°.

EXAMPLE 3

This example illustrates the preparation of copoly-(1,4-phenylene fumaramide/terephthalamide) (30/70) and fibers thereof, spun from an anisotropic dope.

The procedure of Example 1, above, is repeated with the exception that 13.77 g. (0.09 mole) of fumaryl chloride and 42.63 g. (0.21 mole) of terephthaloyl chloride are employed. For the washed and dried copolymer, ηinh = 3.41.

An anisotropic spinning dope containing 20 percent by weight solids is prepared by combining 65.2 g. of the above-prepared copolyamide with 255.4 g. of 101.3 percent sulfuric acid. The combined ingredients are transferred to the previously described twin-cell unit and are mixed thoroughly at 80°C. during the course of 10 cycles to form an anisotropic dope. This dope, maintained at 80°C., is extruded through a spinneret as described in Example 1, maintained at 70°C., into an aqueous coagulating bath maintained at 1°C. (ice-water) and positioned one-half inch (1.27 cm.) vertically below the face of the spinneret. The fibers are collected, washed, and dried as described in Example 1, with the windup speed being 666 ft./min. (203 m./min.). The washed and dried filaments exhibit the following tensile properties: T/E/Mi: 18.8/5.75/573; O.A. = 20°.

EXAMPLE 4

This example illustrates the preparation of copoly-(1,4-phenylene fumaramide/terephthalamide) (40/60) and fibers thereof, spun from an anisotropic dope.

The synthesis procedure of Example 1, above, is repeated with the exception that 18.36 g. (0.12 mole) of fumaryl chloride and 36.54 g. (0.18 mole) of terephthaloyl chloride are employed. The reaction mixture is cooled for a period of three hours and is stirred overnight. For the washed and dried copolymer, ηinh = 3.67.

An anisotropic spinning dope containing 20 percent solids is prepared in the manner described in the previous examples, using 62 g. of the copolymer prepared as described above and 248 g. of 100.2 percent sulfuric acid. The temperature of the twin-cell unit is 80°C. and that of the spinneret is 70°C. The coagulating bath is an ice-water bath maintained at −1°C. and positioned one-half inch (1.27 cm.) vertically below the face of the spinneret. The emerging fibers are wound up at the rate of 995 ft./min. (303 m./min.). The washed and dried filaments exhibit the following tensile properties: T/E/Mi: 18.0/5.73/562; O.A. = 22°.

EXAMPLE 5

This example illustrates the preparation of copoly-(1,4-phenylene fumaramide/terephthalamide) (60/40) and fibers thereof, spun from an anisotropic dope.

The procedure of Example 1, above, is followed with the exception that 27.54 g. (0.18 mole) of fumaryl chloride and 24.36 g. (0.12 mole) of terephthaloyl chloride are employed. After the reaction mixture is stirred overnight, it is permitted to stand at autogenous temperature for approximately 4 days. The copolymer is then isolated and collected as described in Example 1. For the washed and dried copolymer, ηinh = 1.91.

An anisotropic spinning dope containing 20 percent solids is prepared, as described in the preceding examples, by combining 53.2 g. of the above-described copolyamide and 212.8 g. of 100.2 percent sulfuric acid. The twin-cell unit is maintained at 68°C. and the spinneret at 70°C. The spinneret is of 20-holes, each hole of 0.002 inch (0.005 cm.) diameter, and is positioned one-half inch (1.27 cm.) vertically above the coagulating bath which is maintained at −1°C. The fibers are collected at the rate of 700 ft./min. (213 m./min.). For the washed and dried filaments, the following tensile properties are observed: T/E/Mi: 8.3/4.80/385; O.A. = 30°.

EXAMPLE 6

This example illustrates the preparation of copoly-(1,4-phenylene mesaconamide/terephthalamide) (20/80) and an anisotropic dope thereof.

The general procedure of Example 1, above, is followed with the exception that the following amounts of reactants and solvents are employed: HMPA:43 ml.; NMP:87 ml.; 1,4-phenylenediamine:3.24 g. (0.03 mole); mesaconyl chloride:1.00 g. (0.006 mole); terephthaloyl chloride:4.87 g. (0.024 mole). The synthesis procedure of Example 1, above, is followed with the exception that the mesaconyl chloride is added dropwise at room temperature to the diamine solution. After 1 minute of further reaction time, the terephthaloyl chloride is added. For the washed and dried copolyamide, ηinh = 2.55.

An optically anisotropic dope containing 20 percent solids is formed at 27°C. by dissolving a sample of the copolyamide in 100 percent sulfuric acid.

EXAMPLE 7

This example illustrates the preparation of copoly-(1,4-phenylene mesaconamide/terephthalamide) (50/50).

The procedure of Example 6, above, is followed with the exception that 2.51 g. (0.015 mole) of mesaconyl chloride and 3.05 g. (0.015 mole) of terephthaloyl chloride are employed. The mesaconyl chloride is added to the diamine solution at room temperature. After 1 minute of further reaction time, the terephthaloyl chloride is added. For the washed and dried copolyamide, ηinh = 1.15. An anisotropic dope is formed as in Example 6, above.

EXAMPLE 8

This example illustrates the preparation of copoly-(1,4-phenylene/3,3'-dimethyl-4,4'-biphenylene fumaramide/terephthalamide) of the following composition rations: 95/5–20/80 and 90/10–20/80, and anisotropic dopes and high strength fibers.

Part A

The procedure of Example 1, above, is followed with the following reactants and solvents being employed: 1,4-phenylenediamine:30.78 g. (0.285); 3,3'-dimethylbenzidine:3.18g. (0.015 mole); fumaryl chloride:9.18 g. (0.06 mole); terephthaloyl chloride:48.72 g. (0.24 mole); HMPA:500 ml.; NMP:500 ml. The fumaryl chloride is added to the solution of mixed diamines with rapid stirring. After 2 minutes the terephthaloyl chloride is added. After following the procedure of Example 1, above, the washed and dried copolyamide exhibits an inherent viscosity of 2.48.

An anisotropic spinning dope containing 20 percent solids is prepared by combining 90 g. of the above-described copolyamide with 360 g. of 100.4 percent sulfuric acid. The combined ingredients are mixed at 73°C. during the course of 5 cycles in the twin-cell unit to form an anisotropic dope. This dope, maintained at 73°C., is extruded through a spinneret as in Example 5, maintained at 60°C., into an aqueous coagulating bath maintained at 1°C. (ice-water) and positioned one-half inch (1.27 cm.) vertically below the face of the spinneret. The emerging fibers are wound up at 500 ft./min.

(152 m./min.). The washed and dried filaments exhibit the following tensile properties: T/E/Mi: 13.2/5.0/544; O.A. = 20°.

Part B

The procedure of Part A, above, is repeated with the exception that 29.16 g. (0.27 mole) of 1,4-phenylenediamine and 6.36 g. (0.03 mole) of 3,3'-dimethylbenzidine are employed. For the washed and dried copolymer, $\eta$inh = 1.97

An anisotropic spinning dope containing 20 percent solids is prepared by combining 80 g. with the above-described copolyamide with 320 g. of 100.4 percent sulfuric acid. The combined ingredients are maintained at 65°C. in the twin-cell unit; an anisotropic dope is formed after 5 cycles.

EXAMPLE 9

This example illustrates the preparation of poly-(chloro-1,4-phenylene fumaramide) and an optically anisotropic dope thereof.

Part A

To a stirred solution of chloro-1,4-phenylenediamine (2.84 g., 0.02 mole) in cooled (solid carbon dioxide bath) HMPA (30 ml.) is added fumaryl chloride (2.16 ml., 0.02 mole) in 10 ml. of tetrahydrofuran (THF). The cooling bath is removed after 10 minutes and the combined, stirred ingredients are allowed to warm to room temperature during the next 50 minutes, after which lithium carbonate (1.48 g.) is added. After the reaction mixture is stirred for an additional 3 hours at room temperature, it is combined with water to precipitate the polymer which is collected, washed separately with water and with methanol, and dried in vacuo at 80°C. The dried polyfumaramide exhibits an inherent viscosity of 0.67.

An anisotropic dope of the above-prepared polyfumaramide is prepared according to the following procedure: A 0.91 g. sample of the polyamide is added to 2 ml. of 96 percent sulfuric acid to form an isotropic dope containing 20 percent weight solids; to this is added an additional 0.45 g. of the polyamide and the combined ingredients heated to 50°C., then cooled to form an isotropic dope containing 27 percent solids; an additional 0.30 g. of polyamide is added, the ingredients are heated to 50°C., then cooled to 25°C. to form an anisotropic dope containing 31 percent by weight solids. Anisotropy is determined by use of a polarizing microscope according to the procedures of U.S. Pat. No. 3,671,542.

Part B

The synthesis procedure of Part A, above, is repeated but with the change that the solvent for the diamine is a mixture of HMPA/NMP (10 ml./10 ml.). The dried poly(chloro-1,4-phenylene fumaramide) exhibits an inherent viscosity of 0.45.

An anisotropic dope is prepared from the above-prepared polyamide and 99.7 percent sulfuric acid by the following procedure. The acid (2 ml.) is combined with 0.91 g. of the polyamide to form an isotropic dope; separate 0.45 g. and 0.30 g. samples of the polyamide are added to form isotropic dopes containing, respectively, 27 and 31 percent weight percent of the polyamide. Finally, an additional 0.29 g. of the polymer is added to form an anisotropic dope containing 33.7 percent by weight solids.

EXAMPLE 10

This example illustrates the preparation of poly(1,4-phenylene fumaramide) and an anisotropic dope thereof in fluorosulfonic acid.

To a stirred solution of p-nitroaniline (28.3 g.), ethyldiisopropylamine (26.0 g.), and acetone (500 ml.) is added, dropwise through an addition funnel, a solution of fumaryl chloride (15.3 g.) in ether (200 ml.). The reaction is permitted to run for an additional 20 minutes after which the precipitated product (I) 1,2-bis(4-nitrobenzamido)-trans-vinylene, is filtered off, washed with water (2X), methanol (2X), and ether (1X). The crude product is recrystallized from 500 ml. of DMAc to yield yellow needles which melt within the range of 386°–400°C.; the yield is 24.5 g.

The recrystallized product prepared above is dissolved in DMAc and is catalytically reduced under hydrogen (using 1 g. of 10 percent Pd on charcoal) to (II) 1,2-bis(4-aminobenzamido)-trans-vinylene, mp = 232°C.

To a stirred solution of (II) (2.96 g.) in HMPA/NMP (30 ml./30 ml.) is added, dropwise, fumaryl chloride (1.53 g.). After 35 minutes a thick gel results. The gel is combined with water to precipitate the poly(1,4-phenylene fumaramide) which is collected, washed with water (2X, 500 ml.) and with methanol (2X, 500 ml.) and dried; $\eta$inh = 2.28.

When 0.5 g. of the above-prepared polyamide is combined with 2.0 g. of fluorosulfonic acid at room temperature an isotropic dope (20 percent solids) is produced. Similarly, when 1.0 g. of the above-prepared polyamide is combined with 3.0 g. of fluorosulfonic acid and heat applied, an isotropic dope containing 25 percent solids is obtained. However, when 1.0 g. of the above-prepared polyamide is combined with 2.7 g. of fluorosulfonic acid and the resulting combination warmed to 50°C., a stable anisotropic dope containing 27 percent solids is obtained.

EXAMPLE 11

This example illustrates the preparation of anisotropic fluorosulfonic acid dopes of copoly(1,4-phenylene fumaramide/terephthalamides).

a. A 1 g. sample of copoly(1,4-phenylene fumaramide/terephthalamide) (20/80), prepared by the procedure of Example 2 herein and exhibiting an inherent viscosity of 2.75, is combined with 4 g. of fluorosulfonic acid. The heat of mixing permits formation of a fluid, anisotropic dope (20 percent solids) which solidifies at about 50°C.

b. A 1 g. sample of copoly(1,4-phenylene fumaramide/terephthalamide) (40/60) of Example 5 herein, $\eta$inh = 1.91, is combined with 4 g. of fluorosulfonic acid. The heat of mixing permits formation of a fluid, anisotropic dope (20 percent solids) which solidifies at about 50°C.

What is claimed is:

1. A anisotropic dope of a polymer in concentrated sulfuric acid within the concentration range of about 96–105% $H_2SO_4$ or in fluorosulfonic acid, said polymer consisting essentially of repeating units of the formula:

wherein $R_1$ represents an aromatic radical selected from the group of 1,4-phenylene; methyl-1,4-phenylene; chloro-1,4-phenylene; bromo-1,4-phenylene, fluoro-1,4-phenylene; 4,4'-carbonamidodiphenylene; 4,4'-biphenylene; 3,3'-dichloro-4,4'-biphenylene; 3,3'-dimethoxy-4,4'-biphenylene; and 3,3'-dimethyl-4,4'-biphenylene; $R_2$ represents an organic radical selected from the group of trans-vinylene and trans-methylvinylene radicals; with the proviso that up to 90 mole percent of the $R_2$ radicals may be replaced by radicals selected from the group of 1,4-phenylene and chloro-1,4-phenylene, the said polymer having an inherent viscosity of at least about 1.0.

2. The dope of claim 1 wherein the polymer is copoly-(1,4-phenylene fumaramide/terephthalamide).

3. The dope of claim 1 wherein the polymer is poly-(chloro-1,4-phenylene fumaramide).

* * * * *